Nov. 16, 1948.  L. J. DE MUTH  2,454,139
ROAD MAP HOLDER INCLUDING A ROTATABLE ROLLER
Filed Feb. 11, 1947
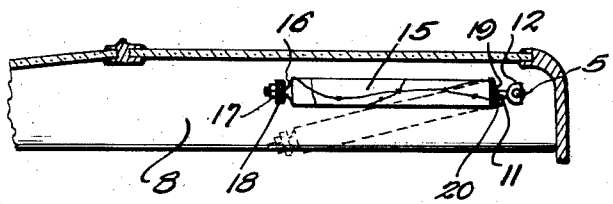
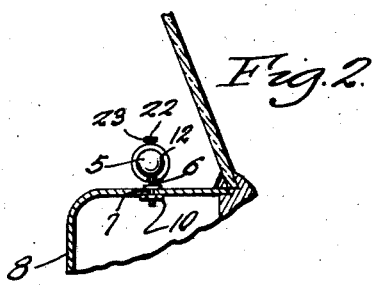
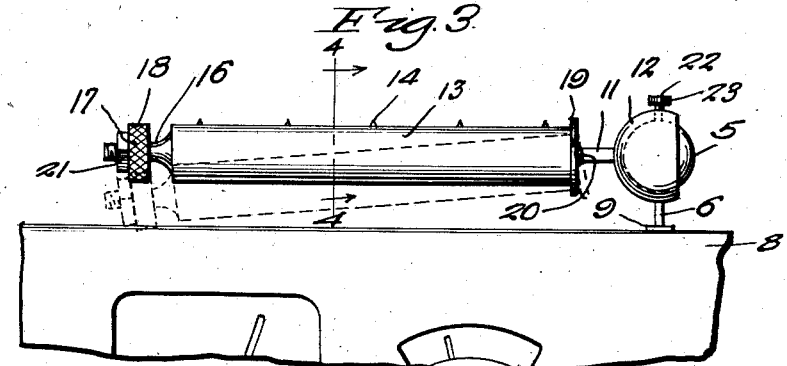
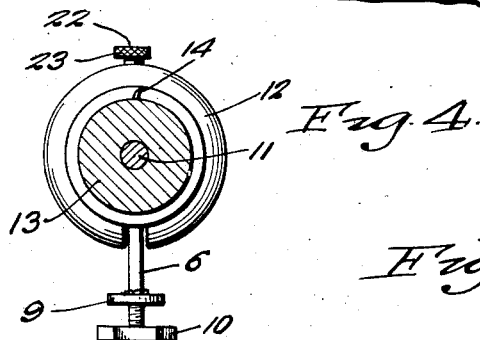
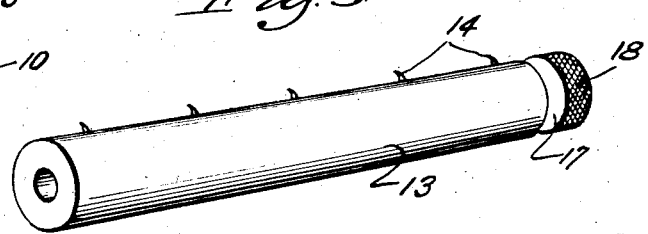
Inventor
LINUS J. DE MUTH
By *Clarence A. O'Brien and Harvey B. Jacobson*
Attorneys Patented Nov. 16, 1948

2,454,139

UNITED STATES PATENT OFFICE 2,454,139

ROAD MAP HOLDER, INCLUDING A ROTATABLE ROLLER

Linus J. De Muth, Fresno, Calif.

Application February 11, 1947, Serial No. 727,884

3 Claims. (Cl. 40—68)

1

This invention relates to new and useful improvements in road map holders and more particularly to a road map holder for vehicles.

The primary feature of the present invention is to provide an attachment for vehicles adapted to hold a road map in a convenient easy to reach position.

Another important feature of this invention is to provide a device of the character referred to which is pivotally mounted on the dashboard of a vehicle and is quickly accessible to the driver of said vehicle.

A further feature of the present invention is to provide a road map holder that is neat and compact and occupies very little space when in place.

A still further feature of the present invention is to provide a device of the class described including a rotatable roller on which is held a conventional size road map.

Still another feature of this invention is to provide a device of the character described that is simple and practical in construction, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view showing the device attached to a vehicle dashboard with parts shown in section;

Figure 2 is an end view thereof;

Figure 3 is an enlarged front elevational view of the device attached to a vehicle dashboard;

Figure 4 is an enlarged sectional view taken on the line 4—4 of Figure 3, and

Figure 5 is a perspective view of the roller removed from the device.

Referring now to the drawings in detail, wherein for the purpose of illustration I have disclosed a preferred embodiment of the present invention, the numeral 5 represents a usual ball preferably solid and carrying a bolt 6 which projects outwardly from the ball and is adapted to extend through an opening 7 conveniently located in the upper portion of a usual vehicle dashboard 8, although said ball may be also attached to any other convenient portion of said vehicle without changing the function of same.

A washer 9 is preferably secured on said bolt to prevent said bolt from slipping vertically and a nut 10 threaded on the lower end of said bolt holds same in correct position.

A longitudinally extending rod 11 has a semispherical socket 12 secured to one end thereof and said socket is journaled on ball 5 for swivel movement as is convential in ball and socket joints.

Journaled for rotation on rod 11 is a cylindrical roller 13 having a plurality of longitudinally spaced curved prongs 14 which are adapted to grip one edge of a usual road map 15 rolled on the periphery of said roller.

Integrally formed at the outer decreased end 16 of roller 13 is a finger knob 17 having a roughened surface 18 to facilitate easy rotation of the roller.

A washer 19 secured as at 20 to the rod loosely bears against one end of roller 13 and a nut 21 threaded on the end of rod 11 prevents longitudinal slipping of said roller on the rod.

A set screw 22 having a roughened surface 23 is secured to the upper portion of socket 12 and is adapted to engage the ball 5 to secure the rod and roller in swingably adjusted position.

In operation the device being secured to a dashboard as previously described, one edge of a map is gripped on prongs 14 and said map is rolled on the surface of roller 13 and the opposite edge of the map is also punctured by the prongs.

The desired portion of the map is found by rotating roller 13 by use of finger knob 17 and the rod is conveniently swung toward the reader by releasing set screw 22.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A road map holder of the class described comprising a ball, means for securing the ball to a part of a vehicle, an elongated rod, a socket carried by one end of the rod, said socket journaled on the ball for swivel movement of the rod, a roller journaled for rotation on the rod, and a line of longitudinally spaced teeth projecting outwardly from said roller adapted to grip the edges of a conventional map rolled on the periphery of said roller.

2. A road map holder of the class described comprising a ball, means for securing the ball to a part of a vehicle, an elongated rod, a socket carried by one end of the rod, said socket journaled on the ball for swivel movement of the rod, a roller journaled for rotation on the rod, an integral finger knob formed at the outer end of said roller for rotating said roller on the rod, and a line of longitudinally spaced curved teeth projecting outwardly from said roller adapted to grip the edges of a conventional map rolled on the periphery of said roller.

3. A road map holder of the class described comprising a ball, means for securing the ball to a part of a vehicle, an elongated rod, a semi-spherical socket secured to one end of the rod, said socket journaled on the ball for swivel movement of the rod, a set screw carried by said socket to secure the rod in adjusted position, a roller journaled for rotation on the rod, an integral finger knob formed at the outer end of said roller for rotating the roller on the rod, and a line of longitudinally spaced teeth projecting outwardly from said roller adapted to grip the edges of a conventional map rolled on the periphery of the roller.

LINUS J. DE MUTH.

REFERENCES CITED

The following references are of record in the file of this patent:

UNITED STATES PATENTS

| Number | Name | Date |
| --- | --- | --- |
| 1,099,882 | Montgomery | June 4, 1914 |
| 1,576,028 | Bowen | Mar. 9, 1926 |
| 1,667,967 | Crimmins | May 1, 1928 |